United States Patent

Ichiyama

[11] Patent Number: 6,034,454
[45] Date of Patent: Mar. 7, 2000

[54] MOTOR

[75] Inventor: Yoshikazu Ichiyama, Kyoto, Japan

[73] Assignee: Nidec Corporation, Ukyo-ku, Kyoto, Japan

[21] Appl. No.: 09/276,139

[22] Filed: Mar. 25, 1999

[30] Foreign Application Priority Data

Mar. 26, 1998 [JP] Japan .................................. 10-078805

[51] Int. Cl.[7] .............................. H02K 7/00; F16C 17/00; F16C 33/00
[52] U.S. Cl. .............................. 310/90; 384/115; 384/121
[58] Field of Search .................................... 310/90, 67 R; 384/107, 100, 111–115, 118–121, 123, 124, 132

[56] References Cited

U.S. PATENT DOCUMENTS

| | | | |
|---|---|---|---|
| 4,487,514 | 12/1984 | Mori | 384/113 |
| 5,018,881 | 5/1991 | Asada | 384/113 |
| 5,357,163 | 10/1994 | Minakuchi et al. | 310/90 |
| 5,504,637 | 4/1996 | Asada et al. | 360/98.07 |
| 5,536,088 | 7/1996 | Cheever et al. | 384/107 |
| 5,543,984 | 8/1996 | Itoh | 360/99.09 |
| 5,558,445 | 9/1996 | Chen et al. | 384/132 |
| 5,559,382 | 9/1996 | Oku et al. | 310/90 |
| 5,577,842 | 11/1996 | Parsoneault et al. | 384/114 |
| 5,647,672 | 7/1997 | Fukutani | 384/100 |
| 5,659,445 | 8/1997 | Yoshida et al. | 360/98.07 |
| 5,707,154 | 1/1998 | Ichiyama | 384/107 |
| 5,715,116 | 2/1998 | Moritan et al. | 360/99.08 |
| 5,791,785 | 8/1998 | Nose et al. | 384/119 |
| 5,956,204 | 9/1999 | Dunfield et al. | 384/107 |

FOREIGN PATENT DOCUMENTS

| | | | |
|---|---|---|---|
| 5-060134 | 3/1993 | Japan | F16C 32/00 |
| 5-060135 | 3/1993 | Japan | F16C 32/00 |
| 7-243438 | 9/1995 | Japan | F16C 17/04 |
| 8-074841 | 3/1996 | Japan | F16C 17/10 |
| 8-189525 | 7/1996 | Japan | F16C 17/00 |
| 8-193618 | 7/1996 | Japan | F16C 17/00 |
| 8-221896 | 8/1996 | Japan | G11B 19/20 |
| 8-242550 | 9/1996 | Japan | H02K 7/08 |
| 8-247137 | 9/1996 | Japan | F16C 17/00 |
| 8-335366 | 12/1996 | Japan | G11B 19/20 |
| 9-017110 | 1/1997 | Japan | G11B 19/20 |
| 9-025929 | 1/1997 | Japan | F16C 17/20 |
| 9-063183 | 3/1997 | Japan | G11B 19/20 |
| 9-079263 | 3/1997 | Japan | F16C 33/10 |
| 9-166145 | 6/1997 | Japan | F16C 33/66 |
| 9-189329 | 7/1997 | Japan | F16C 33/10 |
| 9-200998 | 7/1997 | Japan | H02K 5/167 |
| 9-217735 | 8/1997 | Japan | F16C 17/10 |

*Primary Examiner*—Thomas M. Dougherty
*Assistant Examiner*—Burton S. Mullins
*Attorney, Agent, or Firm*—Burns, Doane, Swecker & Mathis, LLP

[57] ABSTRACT

A motor having a shaft body, a generally disk-like thrust plate extending outwardly in a radial direction from an outer periphery surface of the shaft body, a cylindrical sleeve structure which forms a fine clearance between itself on one hand and the shaft body and the thrust plate on the other, with an amount of lubricant fluid maintained in at least a part of the fine clearance. The motor further includes a hydrodynamic bearing apparatus capable of holding the shaft body and the sleeve structure so as to effect a relative rotation between the shaft body and the sleeve structure, any one of the shaft body and the sleeve structure being secured on a rotor equipped with a rotor magnet, the other one of the shaft body and the sleeve structure being adapted to act as a stationary member cooperative with a stator, a radial bearing section capable of holding the lubricant fluid between the shaft body and an internal vertical surface of the sleeve structure, a thrust bearing section capable of holding the lubricant fluid between one side of the thrust plate and an internal horizontal surface of the sleeve structure, and a thrust gas-interposing section communicated to the outside atmosphere formed on the other side of the thrust plate. The rotor is under an action of a magnetic bias in a manner such that the one side of the thrust plate is urged in an axial direction of the sleeve structure.

5 Claims, 4 Drawing Sheets

MOTOR

TECHNICAL FIELD OF THE INVENTION

The present invention relates to a motor, and in particular, to a motor to be provided within a recording medium driving device for rotationally driving a recording medium such as a hard disk, said motor employing a hydrodynamic bearing device with the use of a lubricant fluid.

DESCRIPTION OF THE RELATED ART

Conventionally, there has been known and used a motor equipped with a hydrodynamic bearing device which uses fluid pressure caused between a shaft body and a sleeve structure in order to rotatably support said shaft body and said sleeve structure such that one of them is rotatable relative to the other. An example of such motor will be described in detail below with reference to FIG. 5.

FIG. 5 is a longitudinal sectional view schematically indicating a structure of a motor equipped with a bearing device using a dynamic pressure of a fluid, which is made according to the prior art. As illustrated therein, a conventional motor equipped with a bearing device using fluid dynamic pressure has a cylindrical shaft holder 51 for rotatably holding a shaft body 54, and the cylindrical shaft holder 51 has a large diameter base portion 51a. The outer periphery surface of a lower portion of the large diameter base portion 51a is fixedly fitted in a circular engaging hole 52a of a base plate 52 of a recording medium driving device. Integrally formed with the base portion 51a is an annular ring-shaped plate portion 51b, which is further integrally connected with a small diameter sleeve portion 51c coaxially aligned with the base portion 51a and located at a position higher than the base portion 51a. Further, a thrust cover 53 is fixedly engaged with an internal recessed surface of the base portion 51a adjacent to the lower end thereof, thereby blocking and sealing an internal space of the base portion 51a.

In this way, a shaft body holding structure is thus formed with the use of the shaft body cylindrical shaft holder 51 and the thrust cover 53. The shaft body 54, which is kept vertical within the sleeve portion 51c of the cylindrical shaft holder 51, is used to maintain a lubricant fluid 55, such as a lubricating oil, in a clearance formed between the shaft body 54 and the sleeve portion 51c by virtue of a liquid capillary action, with the assembled structure being freely and relatively rotatable so as to serve as a bearing device using the radial dynamic pressure of the lubricant fluid. Further, on the inner surface of the base portion 51a of the cylindrical shaft holder 51 and on the inner surfaces of the annular ring-shaped plate portion 51b and the thrust cover 53, a ring-shaped thrust plate 56 is engaged around the outer periphery surface of the shaft body 54 adjacent to the lower end thereof. The ring-shaped thrust plate 56 is also used to maintain the lubricant fluid 55 in a clearance formed between the shaft body 54 and the inner surfaces of the above-mentioned portions of the cylindrical shaft holder 51 by virtue of a liquid capillary action, with the assembled structure being freely and relatively rotatable so as to serve as a bearing device using the thrust dynamic pressure of the lubricant fluid. In this manner, with the use of both a radial hydrodynamic bearing structure and a thrust hydrodynamic bearing structure, a hydrodynamic fluid bearing structure is formed which is capable of making use of the dynamic pressure of the lubricant fluid 55 during the relative rotation which occurs between the shaft body 54, the thrust ring-shaped plate 56 and other portions of the shaft body holding structure.

Further, an annular groove 57 is formed on the outer periphery surface of the shaft body 54 at a height adjacent to approximately its middle position. In detail, such annular groove 57 is surrounded by the internal surface of the sleeve portion 51c, forming an annular gas-interposing section 59 which is communicated to the surrounding outside atmosphere through a gas-permeable hole 58 (a spiracle pore) formed on the internal surface of the sleeve portion 51c.

In addition, on both the upper and lower surfaces of the thrust plate 56 and on some inner surface areas of the sleeve portion 51c including an area higher than the gas-interposing section 59 and an area lower than said section 59, there are formed some herring-bone grooves 60. With a rotation of the shaft body 54 in a progressive direction, a radial load supporting pressure and a thrust load supporting pressure will be generated and applied to the lubricant fluids located on these herring-bone grooves 60.

Furthermore, on the outer surface of the sleeve portion 51c is engaged and fixed a stator 61 which is formed by winding a motor coil (not shown) around a stator core (not shown). Further, a cup-like rotor hub 62 having a center hole is engaged and fixed with an outer upper end of the shaft body 54 within the center hole of the cup-like rotor hub 62. Finally, a rotor magnet 63 is secured on the internal surface of the outmost enclosure wall 62a of the rotor hub 62, in a manner such that the rotor magnet 63 radially faces a stator 61 with a predetermined space, thereby forming a rotation driving structure.

When using the above-discussed conventional hydrodynamic fluid bearing assembly including a radial hydrodynamic bearing structure and the thrust hydrodynamic bearing structure, a ring-shaped thrust plate 56 is used in the thrust hydrodynamic bearing structure. In order to ensure a stabilized support for the shaft body 54 in the axial direction and thereby minimize possible vibrations in that direction, both the upper and lower surfaces of the thrust plate 56 are used together so as to act as a thrust hydrodynamic bearing means. Nevertheless, there is a problem that the bearing loss may be large and the electric efficiency of the motor may be low.

Further, there has been known another type of thrust bearing structure where a thrust plate is not used at the same time with a conventional hydrodynamic bearing means, but rather, a plurality of dynamic pressure generating grooves are formed on the end face of a rotational shaft body so as to form the desired thrust bearing structure. Under such circumstances, the bearing loss will be reduced and the electric efficiency of a motor may be improved. However, since said structure does not have a projected portion as would be provided by the thrust plate, it is necessary to provide a special retaining structure for preventing the accidental detaching of the rotational shaft body. Moreover, since the amount of movement in an axial direction is large, a magnetic head for recording information in a recording medium, such as a hard disk, will undesirably make contact with said recording medium, and as a result the recording medium and the magnetic head may be damaged.

SUMMARY OF THE INVENTION

It is therefore an object of the present invention to provide an improved motor with a hydrodynamic bearing means.

It is another object of the present invention to provide a hydrodynamic bearing type motor which is efficient and stable in operation.

It is a further object of the present invention to provide an improved hydrodynamic bearing type motor which has low bearing loss and high electric efficiency with a shaft being stably retained at position.

A motor made according to the present invention comprises a shaft body, a generally disk-like thrust plate extending outwardly in a radial direction from an outer periphery surface of the shaft body, a cylindrical sleeve structure which forms a fine clearance between itself on one hand and the shaft body and thrust plate on the other and an amount of lubricant fluid maintained in at least a part of the fine clearance. The motor further includes a hydrodynamic bearing means capable of holding the shaft body and the sleeve structure so as to effect a relative rotation between the shaft body and the sleeve structure. Any one of the shaft body and the sleeve structure is secured on a rotor equipped with a rotor magnet, the other one of the shaft body and the sleeve structure is adapted to act as a stationary member cooperative with a stator. In particular, the motor is characterized in that: a radial bearing section is formed which is capable of holding the lubricant fluid between the shaft body and an internal vertical surface of the sleeve structure, and further, a thrust bearing section is formed which is capable of holding the lubricant fluid between one side of the thrust plate and an internal horizontal surface of the sleeve structure. A thrust gas-interposing section communicated to the outside atmosphere by way of a communication passageway is formed on the other side of the thrust plate, and the rotor is under the action of a magnetic bias in a manner such that the one side of the thrust plate is urged in an axial direction of the sleeve structure.

In the above structure, the thrust gas-interposing section is communicated with the outside atmosphere. When the above related clearances are being filled with the lubricant fluid or when the motor is rotating, air bubbles will occur within the lubricant fluid due to an agitating action caused by dynamic pressure generating grooves formed on the bearing section. Since these air bubbles may be discharged from those bearing sections through the above communication passageways, it is possible to prevent the problem of the motor temperature rising and causing air bubbles to expand, and hence causing the lubricant fluid to leak out of the bearing sections.

Further, when the outside atmosphere has been effective in forming a good balance between the surface tension of the lubricant fluid and the thrust gas-interposing section, and when the lubricant fluid has been reduced because of its vaporization, the thrust gas-interposing section will be enlarged due to the action of the outside atmosphere. At this time, since the lubricant fluid existing in places other than the above bearing sections will be supplemented to these bearing sections, it is sure that these bearing sections can be constantly filled with the lubricant fluid, thereby ensuring improved reliability for the motor.

In the above gas-interposing section, since there is no viscosity resistance of the lubricant fluid during relative rotation between the shaft body and the sleeve structure, it is possible not only to reduce any losses (bearing loss) caused by the lubricant fluid, but also to ensure an improved electric efficiency for the motor.

A motor made according to another embodiment of the present invention is characterized in that the radial bearing section includes a pair of radial bearings, the lubricant fluids in and around the pair of the radial bearings are separated from each other by a gas-interposing section extending around the entire circumference of the shaft body, said gas-interposing section being communicated to the outside atmosphere by way of the spiracle pores formed on the sleeve structure.

In this way, since a gas-interposing section is formed not only in the thrust bearing section but also in the radial bearing section, it is possible not only to further reduce a bearing loss possibly caused by a lubricant fluid, but also to ensure an improved electric efficiency for the motor. Moreover, with the use of the above structure it is exactly possible to ensure a smooth discharge of air bubbles occurred in the radial bearing section and also to ensure a smooth supplement of the lubricant fluid to the radial bearing section when the lubricant fluid has decreased.

Further, in a motor made according to a further embodiment of the present invention, the spiracle pores formed on said sleeve structure extend to said thrust gas-interposing section, and the thrust gas-interposing section is thus communicated to the outside atmosphere by way of the spiracle pores.

Moreover, the thrust gas-interposing section is communicated with the gas-interposing section formed between the two radial bearings by way of an air passageway formed in the core portion of the shaft body, and it is further communicated to the outside atmosphere by way of the spiracle pores formed on the sleeve structure.

In addition, a motor made according to a yet another embodiment of the present invention is characterized in that the radial bearing section and the thrust bearing section are separated from each other by a gas-interposing section formed between the radial bearing section and the thrust bearing section, by way of the thrust gas-interposing section.

The air bubbles formed within the lubricant fluid tend to be collected near a boundary surface between the radial bearing section and the thrust bearing section. Further, if dynamic pressure generating grooves such as herring-bone grooves are formed on both the radial bearing section and the thrust bearing section, the above phenomenon (air bubble formation) will become more remarkable since dynamic pressure will tend to be collected in the vicinity of a center portion of each herring-bone groove. Accordingly, by providing a gas-interposing section communicated with the outside atmosphere on a boundary area between the radial bearing section and the thrust bearing section, the air bubbles are smoothly removed from this area.

BRIEF DESCRIPTION OF THE DRAWINGS

These, and other, objects, features and advantages of the present invention will become more readily apparent to those skilled in the art upon reading the following detailed description, in conjunction with the appended drawings, in which.

DETAILED DESCRIPTION OF THE PREFERRED EMBODIMENTS

In the following description, some preferred embodiments of a motor equipped with a hydrodynamic bearing device made according to the present invention will be described in detail with reference to the accompanying drawings. However, the present invention should not be limited to these specific embodiments.

Figure 1:
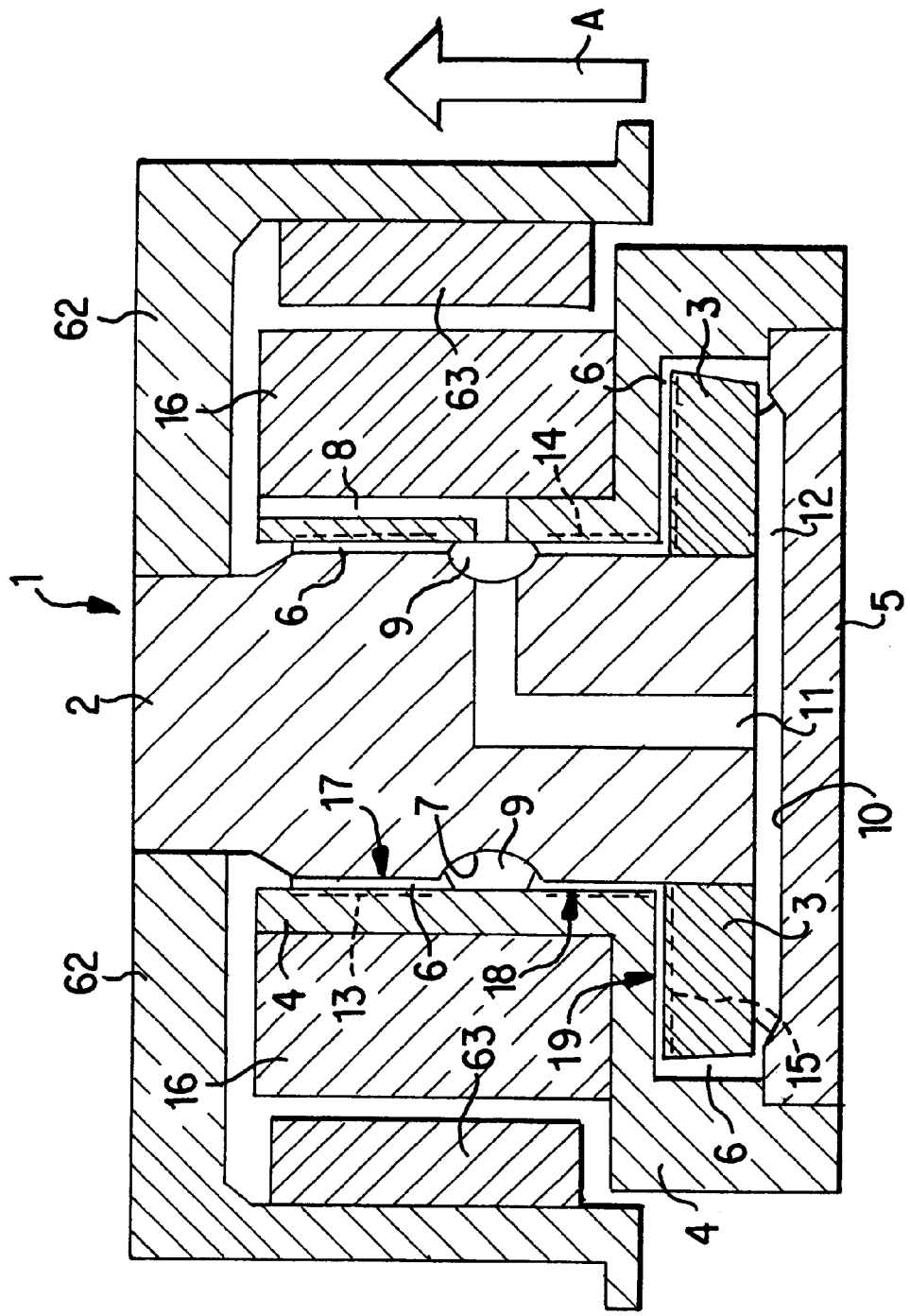
FIG. 1 is a longitudinal sectional view schematically indicating some important portions of a motor equipped with a hydrodynamic bearing device made according to a first embodiment of the present invention.

FIG. 1 is a longitudinal sectional view schematically indicating some important portions of a motor equipped with a hydrodynamic bearing device made according to the first embodiment of the present invention. However, in FIG. 1, some elements or members similar to those in FIG. 5 and having similar functions will be represented by the same reference numerals, and the explanations thereof will therefore be omitted.

Referring to FIG. 1, a motor 1 equipped with a hydrodynamic bearing device made according to the first embodiment of the present invention, comprises a rotational shaft body 2, a thrust plate 3 which is a circular ring-shaped thrust member engaged and fixed on the lower end portion of the rotational shaft body 2, a cylindrical holder 4 which is a sleeve structure for freely rotatably holding the shaft body 2 and the thrust plate 3, a disc like thrust cover 5 fixedly engaged with the recessed internal surface of the cylindrical holder 4 at the lower end thereof, a lubricant fluid 4 such as a lubricating oil maintained in internal spaces formed between the cylindrical holder 4 and thrust cover 5 on one hand, and the rotational shaft body 2 and the thrust plate 3 on the other, by virtue of a liquid capillary action.

The hydrodynamic bearing-equipped motor I further includes a first gas-interposing section 9 and a second gas-interposing section 12 filled with a gas or air. The first gas-interposing section 9 includes an annular groove 7 formed on the outer periphery surface of the rotational shaft body 2 extending over the entire circumference thereof at a height which is approximately the middle of the shaft body 2. Such annular groove 7 is communicated with the outside atmosphere through a gas passageway 8, thereby forming a radial gas-interposing section 9 communicated with the outside atmosphere. On the other hand, the second gas-interposing section 12 includes a internal space 10 having an inner diameter less than the outer diameter of the thrust plate 3, formed between the lower surface of the thrust plate 3 and the thrust cover 5. The interior of the internal space 10 is communicated with the outside atmosphere through a gas passageway 11 communicated with the annular groove 7, thereby forming a thrust gas-interposing section communicated with the outside atmosphere.

The outside atmosphere referred to in the present specification is used to define a surrounding outside atmosphere existing in any places except the fine clearances formed between the shaft body and thrust plate and sleeve structure, thereby including an atmosphere inside the motor, an atmosphere outside the motor, an atmosphere inside an apparatus containing the motor, and an atmosphere outside such apparatus.

A plurality of herring-bone grooves 13 are formed on the internal surface of the cylindrical holder 4 at a height above the first gas-interposing section 9, so that during the rotation of the shaft body 2, a dynamic pressure will occur from both sides towards the tip portion of each V-like groove, and such dynamic pressure happens within the lubricant fluid 6. Further, a plurality of downwardly facing spiral grooves 14 are formed on the internal surface of the cylindrical holder 4 at a height lower than the first gas-interposing section 9. Moreover, a plurality of inwardly facing spiral grooves 15 are formed on the upper surface of the thrust plate 3. In addition, a stator 16 is fixed on the outer surface of the cylindrical holder 4, and the stator 16 and the rotor magnet 63 generate magnetic force such that the rotational shaft body 2 and the thrust plate 3 may be driven within a space defined by the cylindrical holder 4 and the thrust cover 5.

Figure 2A:
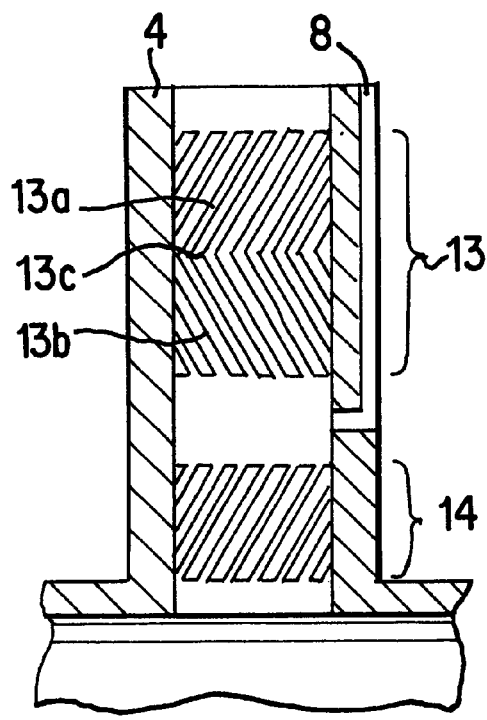
FIG. 2(a) is a cross sectional view schematically indicating some herringbone grooves and some spiral grooves formed on the inner surface of a cylindrical holder shown in FIG. 1.
Figure 2B:
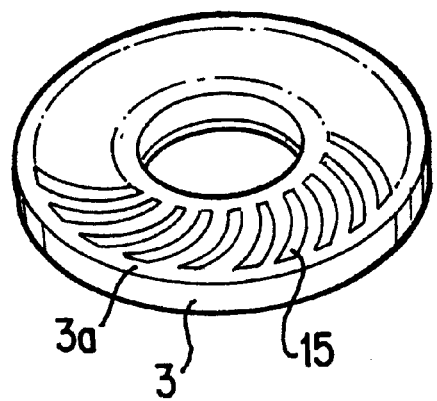
FIG. 2(b) is a perspective view schematically indicating some spiral grooves formed on a thrust plate shown in FIG. 1.

The herring-bone grooves 13 are a plurality of V-like grooves formed on the inner surface of the sleeve-shaped cylindrical holder 4, with each V-like groove consisting of two spiral grooves 13a and 13b arranged in mutually opposite directions, as shown in FIG. 2(a). When the rotational shaft body 3 is rotating, a lubricant fluid 6 will flow from both sides toward a tip portion 13c of each herring-bone groove, thereby producing the desired dynamic pressure. Further, a plurality of spiral grooves 14 are formed on the inner surface of the cylindrical holder 4 adjacent to the lower end thereof. Therefore, when the rotational shaft body 2 is rotating, it is possible to generate a dynamic pressure acting only on the lower side of each groove 14. Further, with a plurality of spiral grooves 15, as show in FIG. 2(b) which is a perspective view illustrating a thrust plate 3, such spiral grooves 15 are formed on the upper surface 3a of the thrust plate 3. In this manner, when the thrust plate 3 is rotating, it is sure to generate a dynamic pressure acting only inwardly towards the center of the plate 3.

Further, referring again to FIG. 1, for the lubricant fluid 6 in a clearance formed between the rotational shaft body 2 and the sleeve-shaped cylindrical holder 4 at a height higher than the first gas-interposing section 9, there is formed an upper radial bearing section 17 which, during the rotation of the rotational shaft body 2, will produce a radial load supporting pressure by virtue of an action of the herring-bone grooves 13. For the lubricant fluid 6 in a clearance formed between the rotational shaft body 2 and the cylindrical holder 4 at a height lower than the first gas-interposing section 9, there is formed a lower radial bearing section 18 which, during the rotation of the rotational shaft body 2, will produce a radial load supporting pressure by virtue of an action of the downwardly facing spiral grooves 14. For the lubricant fluid 6 in a clearance formed between the upper surface of the thrust plate 3 and the cylindrical holder 4, there is formed an upper thrust bearing section 19 which, during the rotation of the thrust plate 3, will produce a thrust load supporting pressure by virtue of an action of the inwardly facing (centerwardly facing) spiral grooves 15. In this way, by virtue of the upper radial bearing section 17, the lower radial bearing section 18 and the upper thrust bearing section 19, there has been formed a hydrodynamic fluid bearing structure capable of reducing a possible bearing loss, thereby obtaining the desired structure formed according to the present invention. In this manner, the present invention obtains a thrust load supporting pressure only with the use of the upper thrust bearing section 19, without the necessity of forming a lower thrust bearing section which has heretofore otherwise been needed as a thrust bearing section in the prior art and which is usually provided on the lower surface of a shaft body. Further, since a plurality of spiral grooves 15 are formed on the upper thrust bearing section 19, the desired bearing span is exactly ensured by virtue of the spiral grooves 15, thereby more exactly ensuring the desired rotation stability and rigidity.

At this time, the second gas-interposing section 12 beneath the thrust plate 3 is communicated with the outside atmosphere by way of the air passageway 11 and an annular groove 7, further through an air passageway 8. When filling the lubricant fluid 6 within the clearance, or when the motor is in rotation, the herring-bone grooves 13 of the upper radial bearing section 17, the downwardly facing spiral grooves 14 of the lower radial bearing section 18, and inwardly facing spiral grooves 15 of the upper thrust bearing section 19, can all serve as dynamic pressure generating grooves, thereby inducing some air bubbles within the lubricant fluid 6 by virtue of an agitating action caused by these grooves. Moreover, since these air bubbles may be expelled out of the above bearing sections by way of the above air passageways, it is possible to prevent the lubricant fluid 6 from leaking out of the bearing sections, thereby preventing a problem which will otherwise be caused by a thermal expansion of the air bubbles due to a rise in motor temperature.

In addition, a surface tension of the lubricant fluid 6, the first gas-interposing section 9 and the second gas-interposing section 12 are in a mutually balanced condition by virtue of the outside atmosphere. Namely, when the lubricant fluid 6 is reduced due to its vaporization, each gas-interposing section will be enlarged in their functional area due to the action of the outside atmosphere, so that lubricant fluid existing in other sections than the bearing sections will be supplied to these bearing sections, thereby improving the reliability for the motor by constantly ensuring the presence of the lubricant fluid 6 in each bearing section.

In this way, since there is not any lubricant fluid 6 staying in the first gas-interposing section 9 and the second gas-interposing section 12, there would be no viscosity resistance during a relative rotation among the rotational shaft body 2, the thrust plate 3, the sleeve-shaped cylindrical holder 4 and the thrust cover 5. For this reason, a loss (bearing loss) possibly caused by or due to the viscosity resistance of the lubricant fluid 6 may be reduced, thereby improving the electric efficiency for the motor.

Further, since the second gas-interposing section 12 is located at a position lower than the thrust plate 3, and since an upper thrust bearing section 19 is provided only on the upper surface of the thrust plate 3, a supporting force acting under the thrust plat 3 for supporting a load in the axial direction will be compensated by virtue of a magnetic bias which is useful for urging the upper surface of the thrust plate 3 in the axial direction of the cylindrical holder 4.

Moreover, since the upper thrust bearing section 19 employs the thrust plate 3, it is possible to inhibit the amount of movement of the rotor in the axial direction. In this way, even if there is an impact from the outside, it is still sure to protect a recording medium such as a hard disk mounted on the rotor and to protect a magnetic head approaching the recording medium for writing data into or reading data from the recording medium. In addition, since the thrust plate 3 is used in the upper thrust bearing section 19, it is not necessary to form a special structure for preventing the rotational shaft body 2 from accidentally sliding away.

With the use of the above structure, although an electric current flowing through the stator 16 will cause the rotational shaft body 2 and the thrust plate 3 to rotate within the cylindrical holder 4 and the thrust cover 5, at this moment in the upper radial bearing section 17, the lubricant fluid 6 in the clearance between the rotational shaft body 2 and the cylindrical holder 4 will produce a radial load supporting pressure due to the fact that the lubricant fluid 6 tends to be drawn toward tip portion of each V-like herring-bone groove 13 by virtue of the rotating action of the rotational shaft body 2. Further, with the lower radial bearing section 18, the lubricant fluid 6 in the clearance between the rotational shaft body 2 and the cylindrical holder 4 will be affected by the spiral grooves 14 such that the lubricant fluid 6 will be drawn downwardly during the rotation of the rotational shaft body 2. Finally, with the upper thrust bearing section 19, the lubricant fluid 6 in the clearance between the thrust plate 3 and the cylindrical holder 4 will be affected by the spiral grooves 14 such that the lubricant fluid 6 will be drawn toward the center of the thrust plate 3 during the rotation of the rotational shaft body 2. As a result, the lubricant fluid 6 is drawn toward a boundary area between the rotational shaft body 2 and the thrust plate 3, so as to produce a radial load supporting pressure and a thrust load supporting pressure.

At this moment, an urging force caused due to a magnetic bias and facing upwardly (a direction as shown by arrow A) is applied to the rotational shaft body 2 and the thrust plate 3. In fact, a good balance is formed and maintained between this urging force and the above thrust load supporting pressure.

The magnetic bias referred to in the present specification is used to define an urging force exerted on the rotor when the rotor is being drawn or repulsed by a magnetic force with respect to a stationary member. In detail, such kind of a magnetic bias may be obtained by rendering a magnetic center of the stator mounted on a stationary member to be different (in an axial direction) from a magnetic center of the rotor magnet fixed on the rotor facing the stator. Further, it is also possible that the same magnetic bias may be obtained by attaching a magnetic material to the rotor magnet of a stationary member in an axial direction, or alternatively, by attaching a homopolarized or heteropoloarized magnet to each of the stationary member and the rotor in an axial direction. Moreover, in a motor made according to the present invention, since a gas-interposing section is formed on the other side of the thrust plate, and since an upper thrust bearing section is provided solely on the upper surface of the thrust plate, a supporting force acting under the thrust plate against a load in the axial direction will be properly compensated by a magnetic bias, in a manner such that the upper surface of the thrust plate will be urged in a direction coincident with the axial direction of the cylindrical holder.

Therefore, with a shaft rotating type spindle motor provided with a thrust plate and a thrust bearing section which only includes one side of the upper thrust bearing section 19, a good balance is formed and maintained between a thrust load supporting pressure caused by the upper thrust bearing section 19 and an upwardly facing urging force caused by a magnetic bias. In this way, although there are not formed some inwardly facing spiral grooves on the underside surface of the thrust plate 3 like those in the prior art, the same effect obtainable by such grooves (inwardly facing spiral grooves) may be similarly obtained by the formation of an urging force caused by the magnetic bias, since such urging force is applied to the rotational shaft body 2 and the thrust plate 3, acting in the axial direction of the rotational shaft body 2. For this reason, it is allowed to reduce a bearing loss which will otherwise be caused by a viscosity resistance of a lubricant fluid, given the fact that there are not any spiral grooves formed on the underside surface of the thrust plate 3 like those in the prior art, thereby ensuring an improved electric efficiency for the motor. Further, with the use of such structure including the thrust plate 3, it has also become possible to inhibit an undesirable movement (an axial vibration) of the rotational shaft body 2 in the axial direction.

In this manner, since the thrust plate 3 may serve to minimize the possible amount of movement (vibration or free movement) of the rotational shaft body 2 in its axial direction, and since an outside impact load may be received by the thrust plate 3 so as to be able to maintain a desired impact resisting capability, it is sure to protect the magnetic head and a magnetic disk even if it meets an outside impact. Further, since a bearing loss is reduced (for example, may be reduced by 30%), a necessary electric current may also be reduced to a great extent.

Accordingly, such structure is most suitable for use in a small size computer such as a portable personal computer which employs only a limited electric current.

In addition, since on the underside surface of the thrust plate 3 there are not formed any spiral grooves which are otherwise needed in the prior art, the manufacturing cost is reduced correspondingly. Moreover, in the present embodiment, the thickness of the thrust plate 3 may be made as thin as possible, provided that such thickness is within a range which does not bring about any unfavourable influence to the formation of a desired right angle and a desired strength which is necessary for preventing an accidental detaching of the rotational shaft body 2.

Although it has been described in the above first embodiment of the present invention that the boundary surface of the lower lubricant fluid may be used to serve as an outer circumferential edge portion of the underside surface of the thrust plate 3, in a second embodiment of the present invention the boundary surface of the lower lubricant fluid may be used to serve as an outer circumferential end face of the thrust plate 21.

Figure 3:
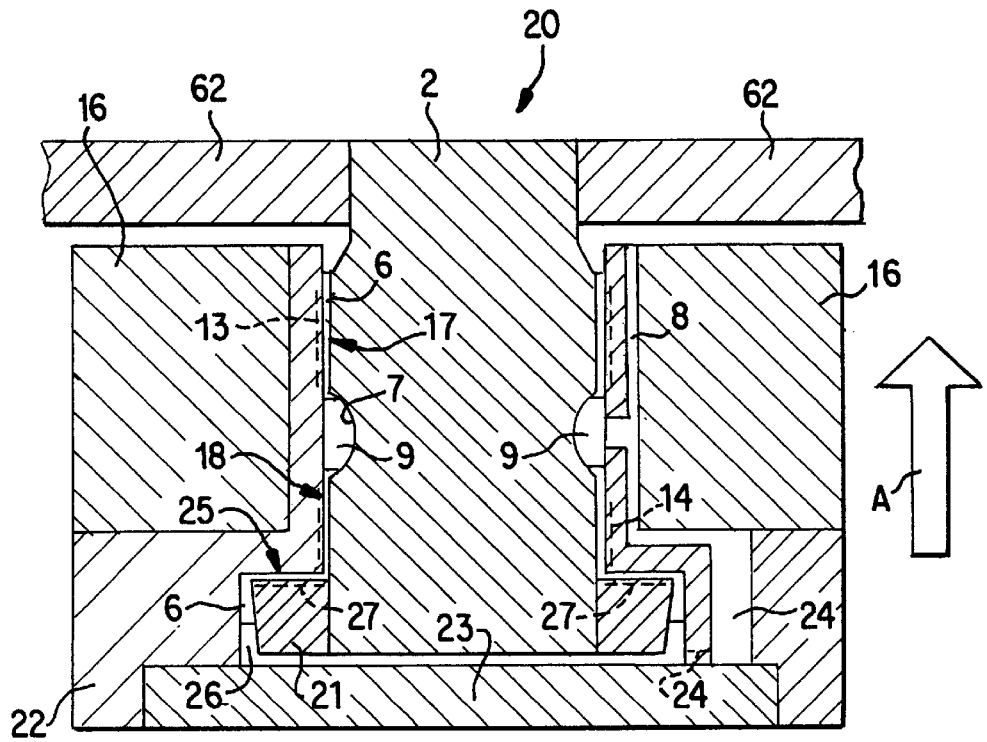
FIG. 3 is a longitudinal sectional view schematically indicating some important portions of a motor equipped with a hydrodynamic bearing device made according to a second embodiment of the present invention.
Figure 5:
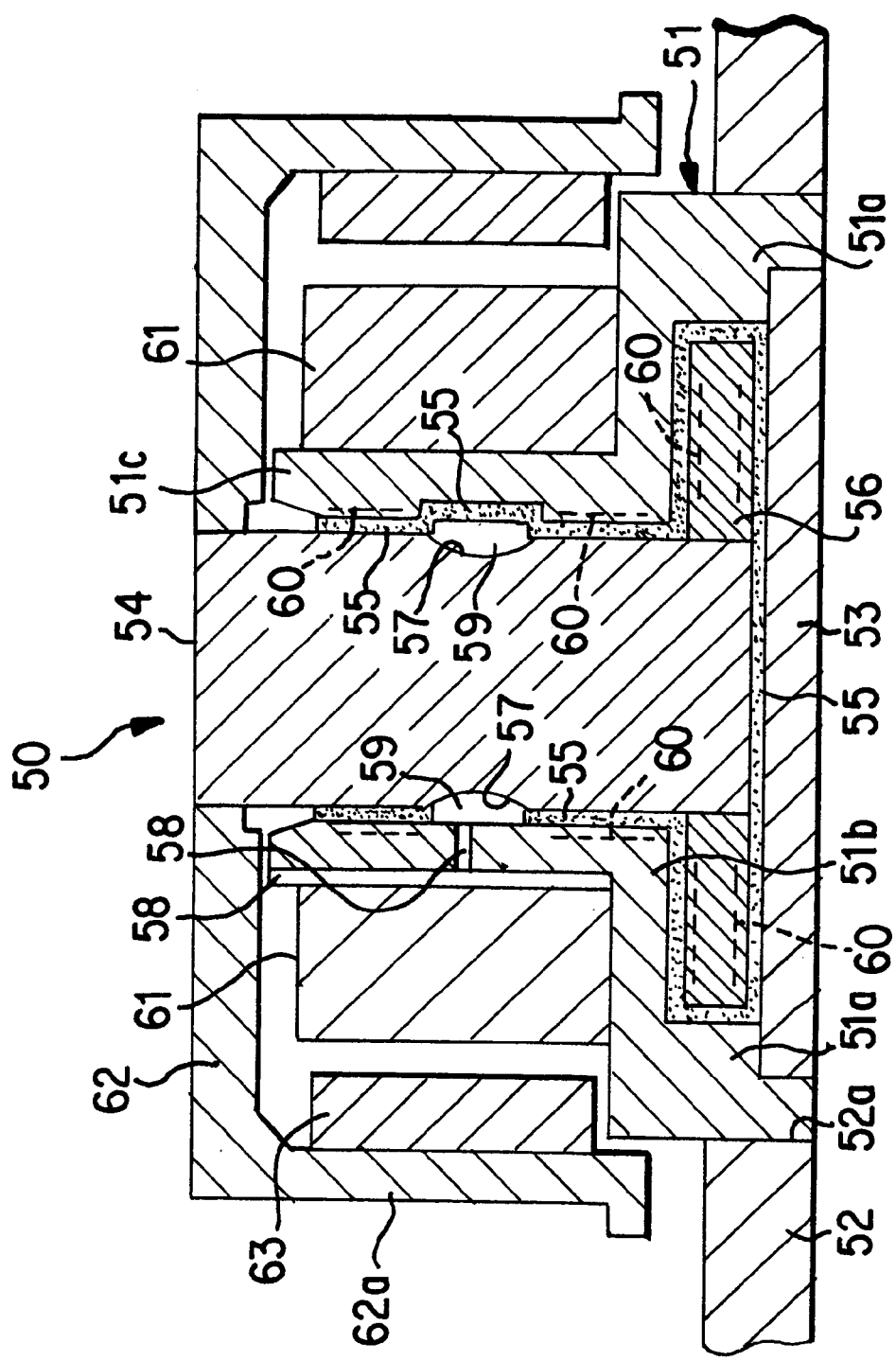
FIG. 5 is a longitudinal sectional view schematically indicating some important portions of a motor equipped with a hydrodynamic bearing device made according to the prior art.

FIG. 3 is a longitudinal sectional view schematically indicating some important portions of a motor equipped with a hydrodynamic bearing device. In FIG. 3, some elements having the same effects as those of the similar elements in FIGS. 1 and 5 are represented by the same reference numerals, thereby omitting the same descriptions thereof.

Referring to FIG. 3, a motor 20 equipped with a hydrodynamic bearing device is constructed in a manner such that a rotational shaft body and a thrust plate 21 may be rotatably driven within the cylindrical holder 22 and a thrust cover 23, therefore being substantially the same as the above first embodiment. However, some differences between the first embodiment and the second embodiment may be described as follows. Namely, a circular disk-like thrust plate 21 has a diameter which is smaller than the similar disk-like thrust plate 3 in first embodiment, so that a bearing loss may be reduced still further. Moreover, the boundary surface of the lubricant fluid 6 surrounding the thrust plate 21 is set to act as an outer circumferential end face of the thrust plate 21. In addition, at a position under the boundary surface of the lubricant fluid 6, one end of an air passageway 24 is opened. Such air passageway 24 is communicated with the air passageway 8 which is in turn communicated to the outside atmosphere and the first gas-interposing section 9. Under such circumstance, the amount of the lubricant fluid 6 is set and poured inwardly, in a manner such that the lower boundary surface of the lubricant fluid 6 is caused to be located around the outer circumferential end face of the thrust plate 3. Furthermore, a container portion of the thrust plate 21 of a cylindrical holder 22 is formed to be small enough to be substantially coincident with the outer diameter portion of the thrust plate 21. Finally, the upper surface of the thrust cover 23 is not formed with a recess portion 10 like that in the first embodiment, thereby ensuring a flat smooth surface.

An upper thrust bearing section 25 serves to cause the lubricant fluid 6, which is in a clearance between the upper surface of the thrust plate 21 and the cylindrical holder 4, to produce a thrust load supporting pressure by virtue of an action obtainable by inwardly facing (centrally facing) spiral grooves 27 during the rotation of the thrust plate 21. As a thrust bearing section, there is not provided a lower thrust bearing section like that in the prior art. In fact, since a thrust load supporting pressure may be obtained simply by using the upper thrust bearing section 25 effected by the disk-like thrust plate 21 having a smaller outer diameter, it is allowed to further reduce a bearing loss which will otherwise be caused due to a viscosity resistance of the lubricant fluid. Further, even if the thrust plate 21 of the upper thrust bearing section 25 is made small in its outer diameter, the formation of the spiral grooves 27 will help to ensure the desired bearing span, so as to ensure the desired rotational rigidity.

At this moment, a second gas-interposing section 26 close to the lower surface of the thrust plate 21, is in fact opened to the outside atmosphere by virtue of communication passageways including an air passageway 24, also by virtue of an annular groove 7 and an air passageway 8. When filling the lubricant fluid 6 within the clearance or when the motor is rotating, air bubbles will occur within the lubricant fluid 6 due to an agitating action caused by some dynamic pressure generating grooves including herring-bone grooves 13 formed on the upper radial bearing section 17, the downwardly spiral grooves 14 formed on the lower radial bearing section 18, and the inwardly facing grooves 27 formed on the upper thrust bearing section 25. Since these air bubbles may be discharged from those bearing sections through the above communication passageways, it is exactly possible to prevent the problem of the motor temperature rising and causing air bubbles to expand and hence cause the lubricant fluid to leak out of the bearing sections.

Further, when the outside atmosphere has been effective in forming a good balance among the surface tension of the lubricant fluid 6, the first gas-interposing section 9 and the second gas-interposing section 26, and when the lubricant fluid 6 has been reduced because of its vaporization, each of the above gas-interposing sections will be enlarged due to the action of the outside atmosphere. At this time, since the lubricant fluid existing in places other than the above bearing sections will be supplied to these bearing sections, it is sure that these bearing sections can be constantly filled with the lubricant fluid 6, thereby ensuring the improved reliability for the motor.

In this way, since the lubricant fluid 6 is not maintained in the first gas-interposing section 9 and the second gas-interposing section 26, there would be no viscosity resistance caused by the lubricant fluid 6 during a relative rotation among rotational shaft body 2, the thrust plate 21, the cylindrical holder 4, and the thrust cover 23. Therefore, a loss (bearing loss) which is possibly caused by the viscosity resistance of the lubricant fluid 6 may be reduced, thereby ensuring the improved electric efficiency for the motor.

Furthermore, since the second gas-interposing section 26 is formed around the lower surface of the thrust plate 21, and since an upper thrust bearing section 25 is provided solely on the upper surface of the thrust plate 21, a supporting force acting under the thrust plate 21 against a load in the axial direction will be properly compensated by an action of a magnetic bias, in a manner such that the upper surface of the thrust plate 21 will be urged in a direction (shown by an arrow A in FIG. 3) coincident with the axial direction of the cylindrical holder 4.

In addition, since the upper thrust bearing section 25 is formed with the use of the thrust plate 21, it has become possible to inhibit the amount of movement of the rotor in the axial direction. In this manner, even if there is an impact from outside, it may be made exactly sure to protect a recording medium such as a hard disk mounted on the rotor and a magnetic head which will get close to the recording medium to read information from or write information into said recording medium. Further, since the thrust plate 21 is used in forming the upper thrust bearing section 25, it is allowed to dispense with a specific structure for preventing an accidental detaching of the rotational shaft body 2.

As described above, apart from the effects obtainable in the above-described first embodiment, since the inwardly facing (centrally facing) spiral grooves 27 with respect to the rotation of the thrust plate 21 are allowed to be made small in their spiral spans in one direction, and since the thrust plate 21 is a disk-like member having a further smaller outer diameter, when the rotational shaft body 2 is rotating it is possible to further reduce a bearing loss possibly caused by a viscosity resistance of the lubricant fluid 6.

Although it has been described in the first embodiment of the present invention that the first gas-interposing section 9 and the second gas-interposing section 12 are communicated with each other by way of an air passageway 11 so that a gas having an identical pressure is interposed in upper and lower positions around the lower radial bearing section 18 and the upper thrust bearing section 19, it is also possible according to a third embodiment of the invention that a third gas-interposing section may be provided between the lower radial bearing section 18 and the upper thrust bearing section 19 so as to separate these two sections apart from each other, thereby avoiding a mutual interference between the lower radial bearing section 18 and the upper thrust bearing section 19.

Figure 4:
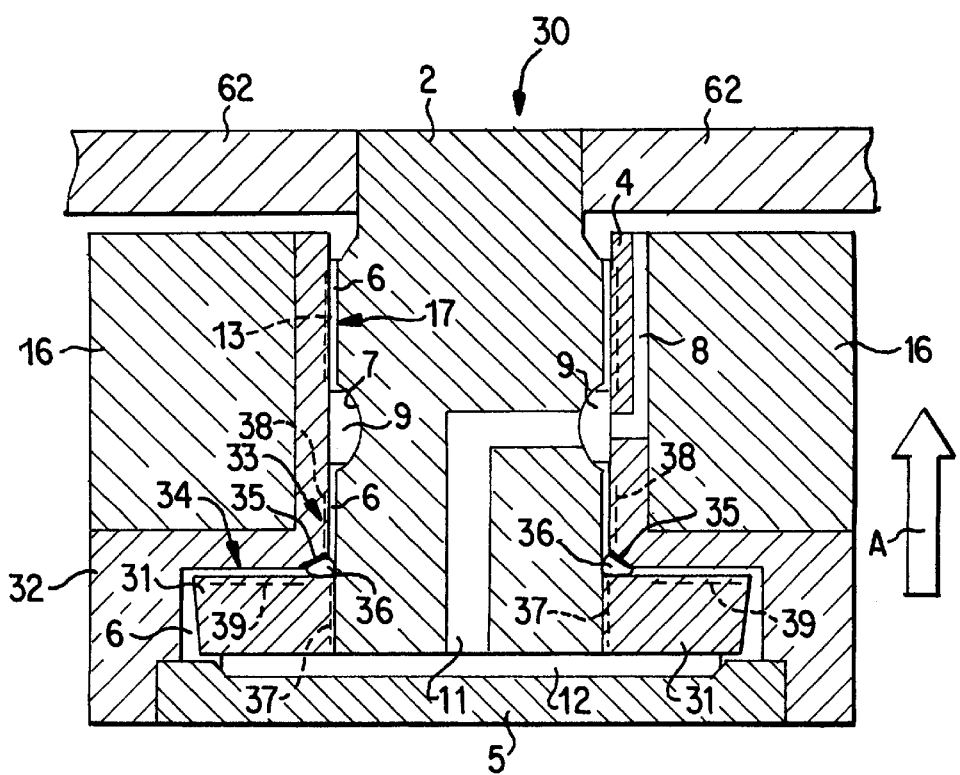
FIG. 4 is a longitudinal sectional view schematically indicating some important portions of a motor equipped with a hydrodynamic bearing device made according to a third embodiment of the present invention.

FIG. 4 is a longitudinal sectional view schematically indicating some important portions of a motor equipped with a hydrodynamic bearing device. In FIG. 3, some elements having the same effects as those of the similar elements in FIGS. 1 and 5 are represented by the same reference numerals, thereby omitting the same descriptions thereof.

Referring to FIG. 4, a hydrodynamic bearing motor 30 is constructed in a manner such that a rotational shaft body 2 and a thrust plate 31 may be rotatably driven within the cylindrical holder 32 and a thrust cover 5, therefore being substantially the same as the above first embodiment. However, some differences between the first embodiment and the third embodiment may be described as follows. Namely, the first gas-interposing section 9 and the second gas-interposing section 12 are communicated with each other by way of an air passageway 11, so that a gas phase having an identical pressure is interposed in upper and lower positions around the lower radial bearing section 33 and the upper thrust bearing section 34. Meanwhile, a third gas-interposing section 36 is provided between the lower radial bearing section 33 and the upper thrust bearing section 34 so as to separate these two bearing sections apart from each other. In detail, the third gas-interposing section 36 includes an annular tapered portion 35 serving as a gas-interposing space, which is located between the lower radial bearing section 33 and the upper thrust bearing section 34, in a manner such that an annular portion of cylindrical holder 32 is formed to protrude in an upward direction toward center of the shaft body 2. Further, the third gas-interposing section 36 is communicated with the second gas-interposing section 12 by way of gas-permeable hole (spiracle pore) 3, forming a gas-interposing zone having an identical pressure. In this manner, it is possible to further reduce a bearing loss during the rotation of the rotational shaft body 2, which bearing loss is possibly caused due to a viscosity resistance of the lubricant fluid 6. Also, it has become possible to prevent a mutual interference between the lower radial bearing section 33 and the upper thrust bearing section 34. In more detail, such kind of spiracle pore 37 is formed on the inner surface of the disk-like thrust plate 31 which is engaged and fixed around the lower end portion of the rotational shaft body 2. At this time, the lubricant fluid 6 is set and poured inwardly in a manner such that the lower boundary surface of the lubricant fluid 6 is just located around the outer circumferential edge portion of the lower surface of the thrust plate 31.

In this way, since the third gas-interposing section 36 has been provided between the lower radial bearing section 33 and the upper thrust bearing section 34 so as to separate the two bearing sections apart from each other, it is allowed to form herring-bone grooves 38 and 39 which can be used to replace the spiral grooves formed on the lower radial bearing section and the upper thrust bearing section (like those in the first embodiment and the second embodiment) because these sorts of different grooves can produce the same effects.

In a hydrodynamic bearing device, when a lubricant fluid is poured inwardly during a process of assembling the device and when an agitation action is occurring which is caused by dynamic pressure generating grooves during the rotation of the rotational shaft body, air bubbles will be formed within the lubricant fluid and such air bubbles will undergo a thermal expansion because of a temperature rising in the bearing sections, hence often causing the lubricant fluid to leak out of the bearing device. With respect to spiral grooves shown in FIG. 2(*a*), in the lower radial bearing section 18 the spiral grooves are facing downwardly to effect a desired dynamic pressure, while in the upper thrust bearing section 19 the spiral grooves are facing inwardly (toward the center axis of the rotational shaft body 2) to effect a desired dynamic pressure. For this reason, a higher fluid pressure than any other portions within the apparatus will be formed on a boundary portion (a boundary portion between the rotational shaft body 2 and the thrust plate 21) between the lower radial bearing section 18 and the upper thrust bearing section 19, while the air bubbles will move in a direction opposite to a dynamic pressure acting direction. In this manner, the air bubbles may be moved to the first gas-interposing section 9 above the lower radial bearing section 18 and to the second gas-interposing section 12 which is on the opposite side of the upper thrust bearing section 19. On the other hand, in the third embodiment of the present invention, like the lower radial bearing section 33 and the upper thrust bearing section 34, if the V-shaped herring-bone grooves 38 and 39 are formed to replace the spiral grooves, a fluid pressure will be collected on the tip portions of V-shaped herring-bone grooves 38 and 39. and a fluid pressure will decrease in an annular corner area located between the lower radial bearing section 33 and the upper thrust bearing section 34. As a result, the air bubbles of the lower radial bearing section 33 and the upper thrust bearing section 34 will be collected in and around such annular corner area. In order to remove such air bubbles, the third embodiment of the present invention requires that the third gas-interposing section 36 communicated with the ambient outside atmosphere should be provided along the annular corner area located between the lower radial bearing section 33 and the upper thrust bearing section 34.

Furthermore, since the second gas-interposing section 12 is formed surrounding the lower surface of the thrust plate 31, and since an upper thrust bearing section 34 in provided solely on the upper surface of the thrust plate 31, a supporting force acting under the thrust plate 31 against a load in the axial direction of the shaft body 2 will be properly compensated by virtue of a magnetic bias, in a manner such that the upper surface of the thrust plate 31 will be urged in a direction (shown by an arrow A in FIG. 4) which is coincident with the axial direction of the cylindrical holder 4.

As described above, apart from the effects obtainable in the above first embodiment, since the third gas-interposing section 36 is provided between the lower radial bearing section 33 and the upper thrust bearing section 34, it has become possible not only to reduce a bearing loss during the rotation of the rotational shaft body, but also to prevent a mutual interference between the lower radial bearing section 33 and the upper thrust bearing section 34.

With the use of the present invention, the thrust gas-interposing section is communicated with the outside atmosphere. When filling the lubricant fluid within the clearance or when the motor is rotating, air bubbles will occur within the lubricant fluid due to an agitating action caused by the dynamic pressure generating grooves formed on the bearing sections. Since these air bubbles may be discharged from those bearing sections through the above communication passageways, it is exactly possible to prevent a problem that motor temperature rising causes air bubbles to thermally expand and hence cause the lubricant fluid to leak out of the bearing sections.

Further, when the outside atmosphere has been effective in forming a good balance between the surface tension of the lubricant fluid and the thrust gas-interposing section, and when the lubricant fluid has been reduced because of its vaporization, the thrust gas-interposing section will be enlarged somehow due to an action of the outside atmosphere. At this time, since the lubricant fluid existing in places other than the above bearing sections will be supplemented to these bearing sections, it is sure that these bearing sections can be constantly filled with the lubricant fluid, thereby ensuring an improved reliability for the motor.

Furthermore, in the above gas-interposing section, since there is not any viscosity resistance of the lubricant fluid during a relative rotation between the shaft body and the sleeve structure, it is possible not only to reduce a loss (bearing loss) caused due to the viscosity resistance of the lubricant fluid, but also to ensure an improved electric efficiency for the motor.

Moreover, since the thrust bearing section is formed by employing a thrust plate, it is possible to inhibit a moving amount of the rotor in the axial direction. In this way, even if there is an impact from the outside, it is still sure to protect a recording medium such as a hard disk mounted on the rotor and to protect a magnetic head approaching the recording medium for writing data into or reading data from the recording medium. In addition, since the thrust plate is used in the thrust bearing section, it is not necessary to form a special structure for preventing the rotational shaft body from accidentally sliding away.

With the use of radial bearings as further defined in the present invention, since a gas-interposing section is formed not only in the thrust bearing section but also in the radial bearing section, it is possible not only to further reduce a bearing loss possibly caused due to a viscosity resistance of a lubricant fluid, but also to ensure an improved electric efficiency for the motor. Moreover, with the use of the above structure it is exactly possible to ensure a smooth discharge of air bubbles occurred in the radial bearing section and also to ensure a smooth supplement of the lubricant fluid to the radial bearing section when the lubricant fluid has decreased somehow.

Still further with the use of spiracle pores formed on said sleeve structure and extending to said thrust gas-interposing section, as described above, the thrust gas-interposing section is communicated to the outside atmosphere by way of the spiracle pores.

As further described in accordance with the present invention, the thrust gas-interposing section may be communicated with the gas-interposing section formed between the two radial bearing sections by way of an air passageway formed in the core portion of the shaft body, and further communicated to the outside atmosphere by way of the spiracle pores formed on the sleeve structure.

In addition, by providing a gas-interposing section communicated with the outside atmosphere on a boundary area between the radial bearing section and the thrust bearing section, it is allowed to smoothly remove the air bubbles accumulated there.

While the present invention has been described with respect to the preferred embodiments, it is to be understood that variations and modifications may be resorted to as will be apparent to those skilled in the art. Such variations and modifications are to be considered within the purview and the scope of the claims appended hereto.

What is claimed is:

1. A motor comprising:

a shaft body;

a generally disk-like thrust plate extending outwardly in a radial direction from an outer peripheral surface of the shaft body;

a cylindrical sleeve structure which forms a fine clearance between itself on one hand and the shaft body and the thrust plate on the other, an amount of lubricant fluid being maintained in at least a part of the fine clearance;

a hydrodynamic bearing means capable of holding the shaft body and the sleeve structure so as to effect a relative rotation between the shaft body and the sleeve structure, any one of the shaft body and the sleeve structure being secured on a rotor equipped with a rotor magnet, the other one of the shaft body and the sleeve structure being adapted to act as a stationary member cooperative with a stator;

a radial bearing section capable of holding said lubricant fluid between said shaft body and an internal vertical surface of the sleeve structure;

a thrust bearing section capable of holding said lubricant fluid between one side of said thrust plate and an internal horizontal surface of the sleeve structure; and a thrust gas-interposing section communicated to the outside atmosphere formed on the other side of the thrust plate;

wherein said rotor is under an action of a magnetic bias in a manner such that the one side of the thrust plate is urged in an axial direction of the sleeve structure.

2. The motor according to claim 1, wherein the radial bearing section includes a pair of radial bearings, the lubricant fluids in and around the pair of the radial bearings are separated from each other by a gas-interposing section extending around the entire circumference of the shaft body, said gas-interposing section being communicated to the outside atmosphere by way of spiracle pores formed on the sleeve structure.

3. The motor according to claim 2, wherein the spiracle pores formed on said sleeve structure are extending to said thrust gas-interposing section, the thrust gas-interposing section is communicated to the outside atmosphere by way of the spiracle pores.

4. The motor according to claim 2, wherein the thrust gas-interposing section is communicated with the gas-interposing section formed between the two radial bearings by way of an air passageway formed in the core portion of the shaft body, and is further communicated to the outside atmosphere by way of the spiracle pores formed on the sleeve structure.

5. The motor according to claim 1, wherein the radial bearing section and the thrust bearing section are separated from each other by a gas-interposing section formed between radial bearing section and thrust bearing section, by way of the thrust gas-interposing section.

\* \* \* \* \*